United States Patent
Noguchi

(10) Patent No.: US 11,592,673 B2
(45) Date of Patent: Feb. 28, 2023

(54) TRANSMISSIVE IMAGE DISPLAY DEVICE

(71) Applicant: SEIKO EPSON CORPORATION, Tokyo (JP)

(72) Inventor: Toshiyuki Noguchi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 252 days.

(21) Appl. No.: 17/105,954

(22) Filed: Nov. 27, 2020

(65) Prior Publication Data
US 2021/0165228 A1   Jun. 3, 2021

(30) Foreign Application Priority Data

Nov. 29, 2019 (JP) .............................. JP2019-216449

(51) Int. Cl.
*G02B 27/01* (2006.01)

(52) U.S. Cl.
CPC ..... *G02B 27/0172* (2013.01); *G02B 27/0179* (2013.01); *G02B 2027/0143* (2013.01); *G02B 2027/0174* (2013.01); *G02B 2027/0178* (2013.01); *G02B 2027/0187* (2013.01)

(58) Field of Classification Search
CPC ............ G02B 27/0172; G02B 27/0179; G02B 2027/0143; G02B 2027/0174; G02B 2027/0178; G02B 2027/0187; G02B 2027/0134
See application file for complete search history.

(56) References Cited

U.S. PATENT DOCUMENTS

| | | | |
|---|---|---|---|
| 2015/0370071 A1* | 12/2015 | Alton | G02F 1/1313 359/275 |
| 2017/0242252 A1* | 8/2017 | Ide | H04N 5/64 |
| 2017/0315417 A1* | 11/2017 | Alton | G02F 1/167 |
| 2018/0259776 A1 | 9/2018 | Alton et al. | |
| 2019/0353908 A1* | 11/2019 | Igarashi | G02F 1/163 |
| 2022/0214550 A1* | 7/2022 | Machida | G02B 27/0176 |

FOREIGN PATENT DOCUMENTS

| | | |
|---|---|---|
| CN | 106461953 A | 2/2017 |
| CN | 107077001 A | 8/2017 |
| JP | 2011-203508 A | 10/2011 |
| JP | 2016-071309 A | 5/2016 |
| JP | 2016-224345 A | 12/2016 |

* cited by examiner

*Primary Examiner* — Bryan Earles
(74) *Attorney, Agent, or Firm* — Oliff PLC

(57) ABSTRACT

A transmissive image display device includes an image generation part configured to emit a light, and a light-guiding optical system configured to guide the light. The light-guiding optical system includes a first deflection part configured to deflect the light, and a second deflection part configured to further deflect the light deflected by the first deflection part to guide the light to a position of the exit pupil while transmitting a portion of external light, a first external light transmittance adjustment part is provided outside an optical path of the light between the first deflection part and the second deflection part, and an average external light transmittance of the first external light transmittance adjustment part is higher than one of an average external light transmittance of the first deflection part and an average external light transmittance of the second deflection part lower than the other.

10 Claims, 10 Drawing Sheets

TRANSMISSIVE IMAGE DISPLAY DEVICE

The present application is based on, and claims priority from JP Application Serial Number 2019-216449, filed Nov. 29, 2019, the disclosure of which is hereby incorporated by reference herein in its entirety.

BACKGROUND

1. Technical Field

The present disclosure relates to a transmissive image display device.

2. Related Art

In recent years, an image display device such as a head-mounted display that is worn on the body of an observer to use it has been available as a wearable information device. JP-A-2016-71309 discloses an image display device including an image generation part and a light-guiding optical part, wherein the light-guiding optical part includes a first deflection part configured to deflect light from the image generation part, and a second deflection part configured to further deflect the light deflected by the first deflection part to guide the light to the exit pupil.

In the image display device of JP-A-2016-71309, each of the first deflection part and the second deflection part located within the viewing range of the observer includes a mirror that allows a portion of the external light to pass therethrough, and thus the observer can view the outside with the image display device worn on the head. In this image display device, however, a region where the transmittance of the external light largely differs is present within the viewing range of the observer, and consequently the observer may have unpleasantness when viewing an external image.

SUMMARY

To solve the above problem, a transmissive image display device of one aspect of the present disclosure includes an image generation part configured to emit light including image information, and a light-guiding optical system configured to guide, to a position of an exit pupil, light from the image generation part. The light-guiding optical system includes a first deflection part configured to deflect light emitted from the image generation part, and a second deflection part configured to further deflect light deflected by the first deflection part to guide the light to the position of the exit pupil while transmitting a portion of external light, a first external light transmittance adjustment part is provided outside an optical path of the light between the first deflection part and the second deflection part, the first external light transmittance adjustment part has light absorbency or light reflectivity for the external light, and an average external light transmittance of the first external light transmittance adjustment part is higher than one of an average external light transmittance of the first deflection part and an average external light transmittance of the second deflection part lower than the other.

In the transmissive image display device of one aspect of the present disclosure, the average external light transmittance of the first external light transmittance adjustment part may be lower than one of the average external light transmittance of the first deflection part and the average external light transmittance of the second deflection part higher than the other.

In the transmissive image display device of one aspect of the present disclosure, the average external light transmittance of the first external light transmittance adjustment part may vary stepwise between the average external light transmittance of the first deflection part and the average external light transmittance of the second deflection part.

In the transmissive image display device of one aspect of the present disclosure, the average external light transmittance of the first external light transmittance adjustment part may linearly vary between the average external light transmittance of the first deflection part and the average external light transmittance of the second deflection part.

In the transmissive image display device of one aspect of the present disclosure, the first deflection part, the second deflection part, and the first external light transmittance adjustment part may be provided at a common base member.

In the transmissive image display device of one aspect of the present disclosure, the first deflection part may be provided at a first base member, the second deflection part may be provided at a second base member, the first external light transmittance adjustment part may be provided at a third base member, and the first base member, the second base member, and the third base member may be joined to each other.

In the transmissive image display device of one aspect of the present disclosure, the first deflection part, the second deflection part, and the first external light transmittance adjustment part may be disposed within an angle range of 100 degrees with respect to an optical axis of the exit pupil.

In the transmissive image display device of one aspect of the present disclosure, the first deflection part may be composed of a semi-transmissive reflection mirror configured to reflect a portion of incident light and transmit another portion of the incident light.

In the transmissive image display device of one aspect of the present disclosure, the second deflection part may be composed of a reflective volume hologram configured to diffract and deflect a portion of incident light.

A transmissive image display device one aspect of the present disclosure includes a right-eye image display part and a left-eye image display part. The right-eye image display part includes a right-eye image generation part configured to emit light including image information, and a right-eye light-guiding optical system configured to guide, toward a position of a right-eye exit pupil, light from the right-eye image generation part, the right-eye light-guiding optical system includes a right-eye first deflection part configured to deflect light emitted from the right-eye image generation part, and a right-eye second deflection part configured to further deflect light deflected by the right-eye first deflection part to guide the light to the position of the right-eye exit pupil while transmitting a portion of the external light, the left-eye image display part includes a left-eye image generation part configured to emit light including image information, and a left-eye light-guiding optical system configured to guide, toward a position of a left-eye exit pupil, light from the left-eye image generation part, the left-eye light-guiding optical system includes a left-eye first deflection part configured to deflect light emitted from the left-eye image generation part, and a left-eye second deflection part configured to further deflect light deflected by the left-eye first deflection part to guide the light to the position of the left-eye exit pupil while transmitting a portion of the external light, a second external light transmittance adjustment part is provided outside an optical path of the light between the right-eye second deflection part and the left-eye second deflection part, the second external light transmittance adjustment part has light absorbency or light reflectivity for the external light, and an average external light transmittance of the second external light transmittance adjustment part is higher than one of an average external light transmittance of the right-eye second deflection part and an average external light transmittance of the left-eye second deflection part lower than the other.

In the transmissive image display device of one aspect of the present disclosure, the average external light transmittance of the second external light transmittance adjustment part may be lower than one of the average external light transmittance of the right-eye second deflection part and the average external light transmittance of the left-eye second deflection part higher than the other.

A transmissive image display device of one aspect of the present disclosure includes a right-eye image display part and a left-eye image display part. The right-eye image display part includes a right-eye image generation part configured to emit light including image information, and a right-eye light-guiding optical system configured to guide, toward a position of a right-eye exit pupil, light from the right-eye image generation part, the right-eye light-guiding optical system includes a right-eye first deflection part configured to deflect light emitted from the right-eye image generation part, and a right-eye second deflection part configured to further deflect light deflected by the right-eye first deflection part to guide the light to the position of the right-eye exit pupil while transmitting a portion of the external light, the left-eye image display part includes a left-eye image generation part configured to emit light including image information, and a left-eye light-guiding optical system configured to guide, toward a position of a left-eye exit pupil, light from the left-eye image generation part, the left-eye light-guiding optical system includes a left-eye first deflection part configured to deflect light emitted from the left-eye image generation part, and a left-eye second deflection part configured to further deflect light deflected by the left-eye first deflection part to guide the light to the position of the left-eye exit pupil while transmitting a portion of the external light, a second external light transmittance adjustment part is provided outside an optical path of the light between the right-eye second deflection part and the left-eye second deflection part, the second external light transmittance adjustment part has light absorbency or light reflectivity for the external light, and an average external light transmittance of the second external light transmittance adjustment part is equal to an average external light transmittance of the right-eye second deflection part and an average external light transmittance of the left-eye second deflection part.

DESCRIPTION OF EXEMPLARY EMBODIMENTS

First Embodiment

A first embodiment of the present disclosure is described below with reference to FIGS. 1 to 7.

A transmissive image display device of the first embodiment is an example of a head-mounted display that is worn on the head of an observer to use it.

In the following description, the term "head mounted display" is abbreviated as "HMD".

Figure 1:
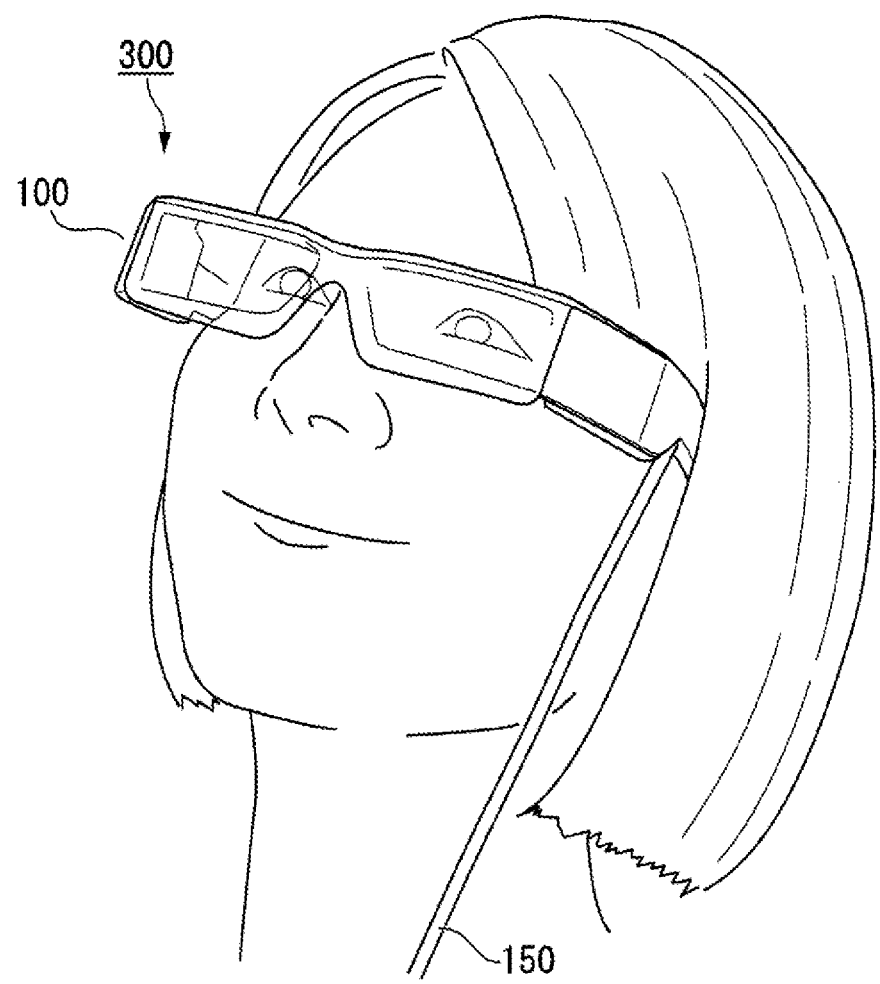
FIG. 1 is a diagram illustrating a state where an observer wears a transmissive image display device of a first embodiment.
Figure 2:
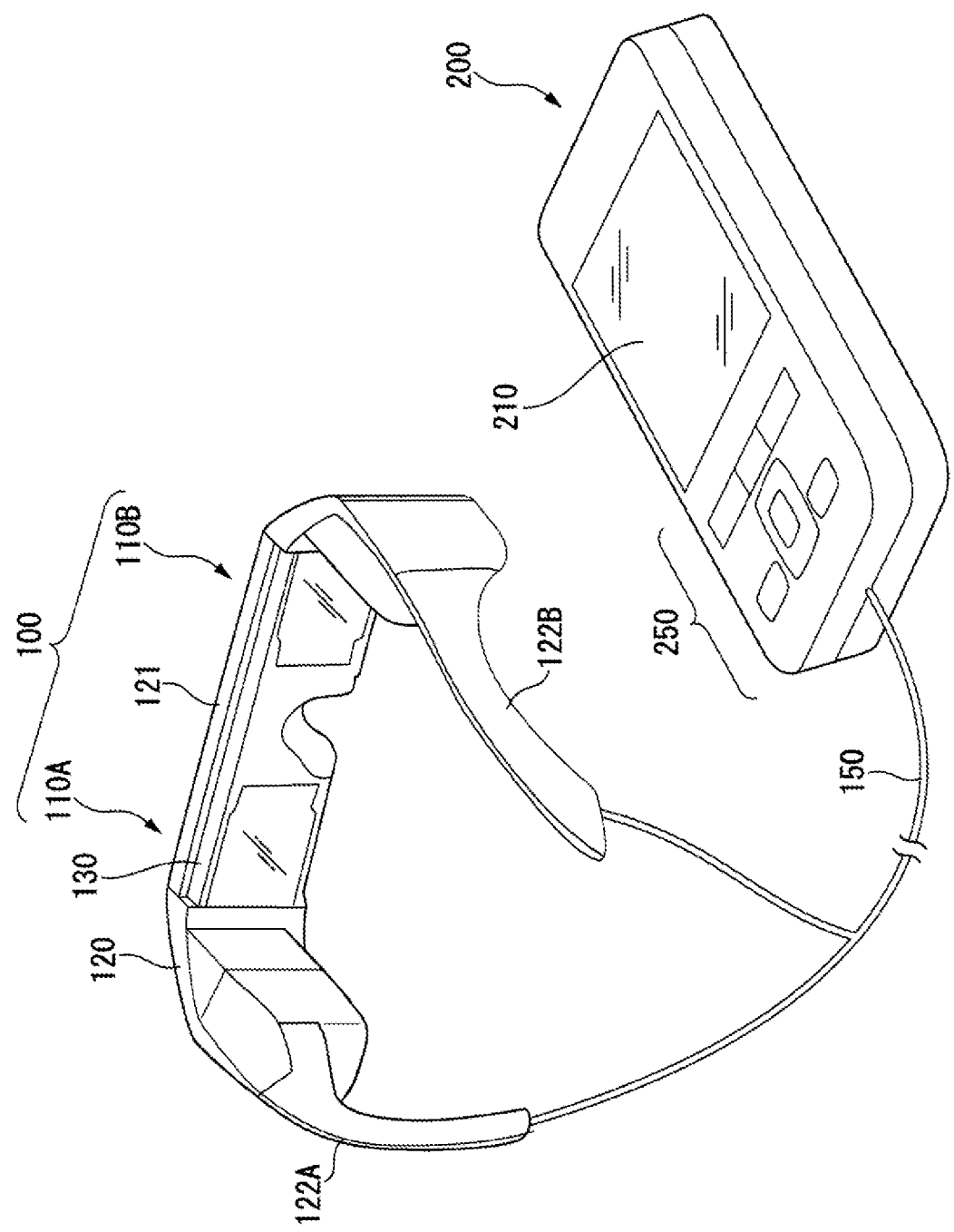
FIG. 2 is a perspective view of the transmissive image display device of the first embodiment.

FIG. 1 is a diagram illustrating a state where an observer wears an HMD of a first embodiment on his or her head. FIG. 2 is a perspective view of the HMD of the first embodiment.

Note that in each of the drawings described below, constituent elements may not be drawn to scale for the sake of clarity of the constituent elements.

As illustrated in FIG. 1, an HMD 300 of this embodiment is worn on the head of the observer to use it in such a manner as to wear glasses. The HMD 300 of this embodiment is a see-through (transmissive) HMD. That is, with the HMD 300 of this embodiment, the observer can visually recognize an image generated by an image display part and can visually recognize an external image such as scenery outside the HMD 300.

As illustrated in FIG. 2, the HMD 300 includes a display device 100 having a glasses-like shape, and a control device (controller) 200 having a size that can be held by the observer by hand. The display device 100 and the control device 200 are communicatively connected with each other in a wired or wireless manner. In this embodiment, each of a left-eye image display part 110A and a right-eye image display part 110B constituting the display device 100, and the control device 200 are communicatively connected to each other in a wired manner through a cable 150 to communicate an image signal and a control signal.

The display device 100 includes a main frame 120, a sub-frame 130, the left-eye image display part 110A, and the right-eye image display part 110B. The control device 200 includes a display part 210 and an operation button part 250. The display part 210 displays items of various information, instructions, or the like to be provided to the observer, for example. The main frame 120 includes a rim portion 121, and a pair of temple portions 122A and 122B for hooking it on the ears of the observer. The sub-frame 130 supports the left-eye image display part 110A and the right-eye image display part 110B.

Figure 3:
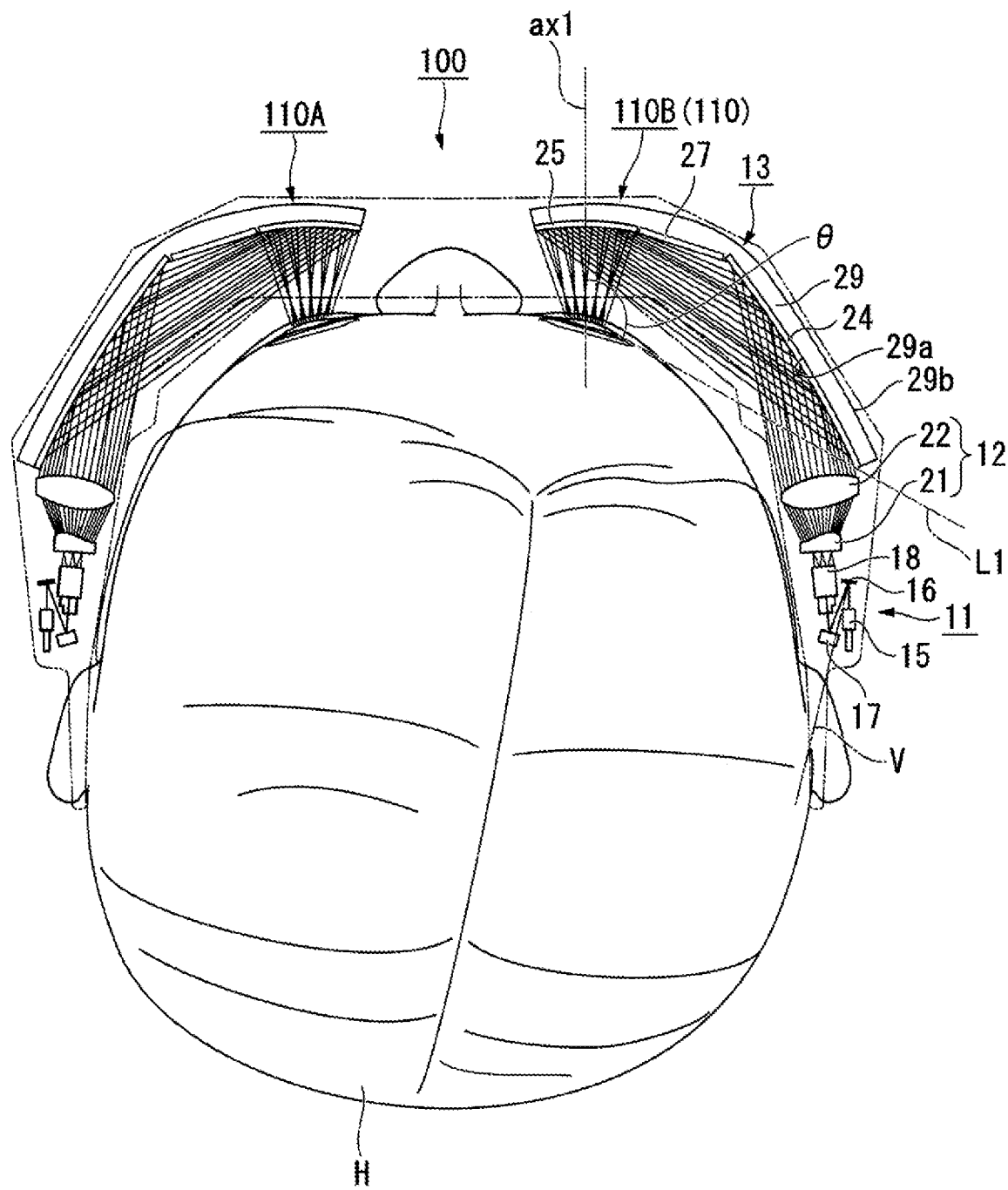
FIG. 3 is a plan view illustrating a schematic configuration of the transmissive image display device.
Figure 4:
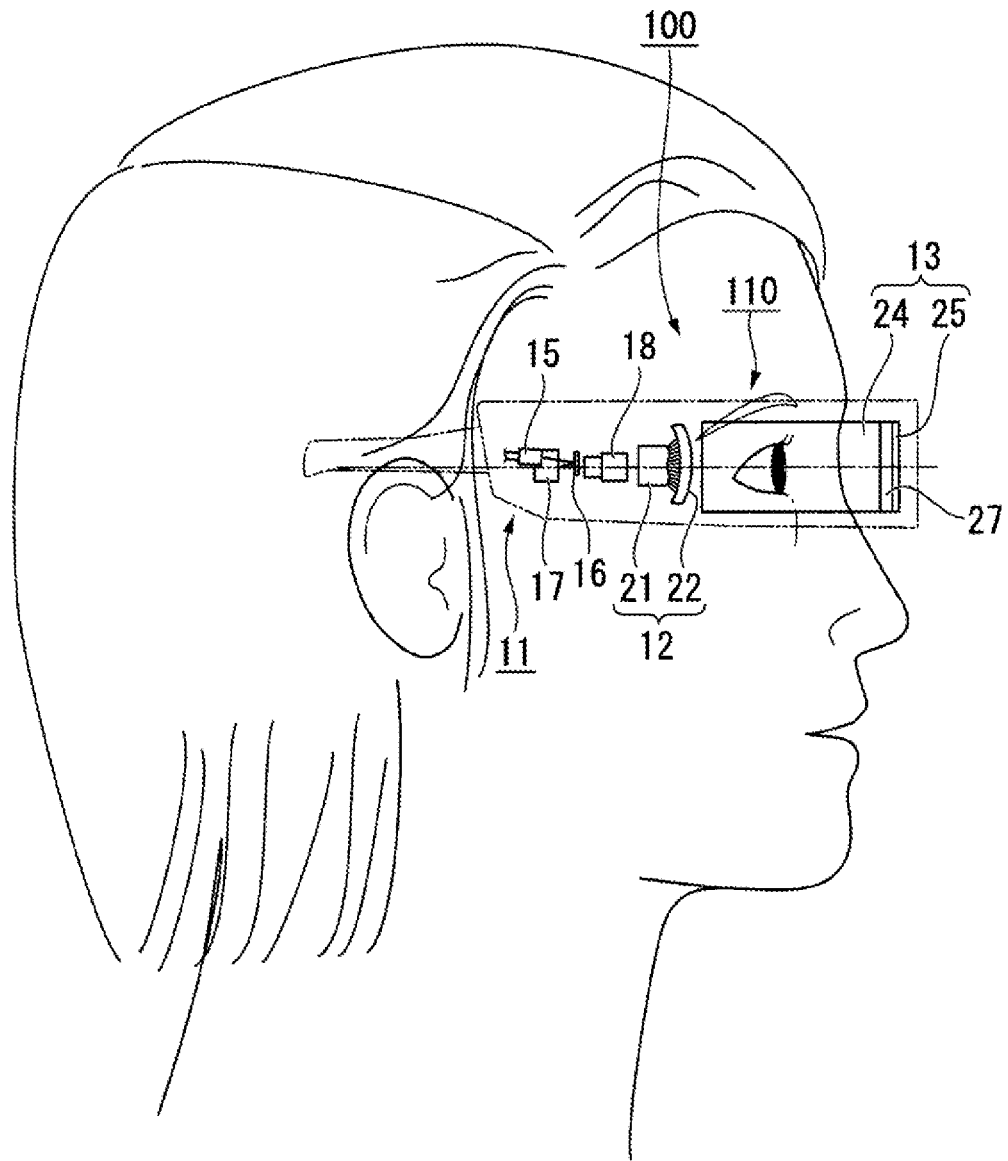
FIG. 4 is a side view illustrating a schematic configuration of the transmissive image display device.

FIG. 3 is a plan view illustrating a configuration of each part of the display device 100. FIG. 4 is a side view illustrating a configuration of the display device 100. In addition, FIGS. 3 and 4 illustrate the observer wearing the display device 100 as viewed from above.

As illustrated in FIG. 3, the right-eye image display part 110B and the left-eye image display part 110A have similar configurations, and the constituent elements inside the image display parts 110B and 110A are symmetrically disposed. Therefore, in the following description, the right-eye image display part 110B is elaborated simply as an image display part 110, and the description of the left-eye image display part 110A is omitted.

As illustrated in FIGS. 3 and 4, the image display part 110 includes an image generation part 11, a correction optical system 12, a light-guiding optical system 13, and a first external light transmittance adjustment part 27. The image generation part 11 emits light that includes image information. The light-guiding optical system 13 guides the light from the image generation part 11 to the position of the exit pupil, i.e., the position of the pupil of the observer. The correction optical system 12 corrects an image of the light from the image generation part 11.

The image generation part 11 includes a light source device 15, a returning mirror 16, an optical scanning device 17, and an afocal optical system 18. The correction optical system 12 includes a first correction lens 21 and a second correction lens 22. The light-guiding optical system 13 includes a first deflection part 24, a second deflection part 25, and a base member 29.

The light source device 15 includes a plurality of solid-state light sources (not illustrated) including a semiconductor laser configured to emit red light, a semiconductor laser configured to emit green light, and a semiconductor laser configured to emit blue light, for example. Each color light emitted from each semiconductor laser is modulated in accordance with the image signal, and each modulated color light is synthesized and emitted from the light source device 15. Light emitted from the light source device 15 is reflected by a returning mirror 16 such that the optical path is returned, and the light is guided to the optical scanning device 17. In this embodiment, the returning mirror 16 is disposed such that a normal V to the reflective surface side is tilted in the direction toward a head H of the observer. As a result, the optical path is returned in the direction toward the head H of the observer from a position away from the head H.

The optical scanning device 17 includes a MEMS mirror, for example. The optical scanning device 17 changes the posture of the MEMS mirror in accordance with the modulation operation of the light source device 15, and two-dimensionally scans the light. In this manner, the light scanning device 17 emits light that includes image information. Hereinafter, the light including image information is referred to as image light. The image light emitted from the light scanning device 17 impinges on the afocal optical system 18. The afocal optical system 18 has a function of collimating incident image light. Thus, the image light emitted from the optical scanning device 17 is collimated by the afocal optical system 18 and emitted from the image generation part 11.

The correction optical system 12 is provided between the image generation part 11 and the light-guiding optical system 13, or more specifically, between the afocal optical system 18 and the first deflection part 24. While the correction optical system 12 is composed of two lenses, namely, the first correction lens 21 and the second correction lens 22 in this embodiment, the number of the correction lenses is not particularly limited. The correction optical system 12, which corrects an image of the image light from the image generation part 11, may not be provided when correction can be achieved by adjusting the curvatures of the first deflection part 24 and the second deflection part 25. Specifically, the second deflection part 25 may have a function of correcting the distortion of the image due to the first deflection part 24, for example.

The first deflection part 24 is composed of a semi-transmissive reflection mirror that reflects a portion of the incident image light, and allows another portion of the incident image light to pass therethrough. The semi-transmissive reflection mirror is composed of a semi-transmissive reflection film provided on one surface of the base member 29 having light transparency such as plastic, for example. The semi-transmissive reflection mirror has incident angle dependency on an incident angle, which is an angle to a direction perpendicular to one surface of the base member 29. The semi-transmissive reflection mirror reflects and deflects image light having an incident angle greater than a predetermined angle, and allows, to pass therethrough, image light having an incident angle smaller than the predetermined angle. The semi-transmissive reflection mirror is formed of a dielectric multilayer film, for example. The above-described predetermined angle can be appropriately adjusted by the design of the semi-transmissive reflection film.

The first deflection part 24 is disposed in an orientation such that the image light emitted from the image generation part 11 impinges at a large incident angle so as to be reflected. Therefore, when the observer views the first deflection part 24, external light having a small incident angle passes through the first deflection part 24 and reaches the pupil of the observer, and thus the observer can visually recognize the external image.

Since the first deflection part 24 is disposed in the above-described orientation, the first deflection part 24 is positioned along the face. In this manner, the first deflection part 24 also performs a role of defining the outer shape of the display device 100 along the face, and contributes to size reduction and enhancement of the design of the display device 100. While the first deflection part 24 is composed of a curved mirror, the first deflection part 24 may be composed of a planar mirror. In addition, a dichroic mirror may be used for the first deflection part 24 to reflect image light for each of different colors.

The second deflection part 25 is composed of a reflective volume hologram that diffracts and reflects a portion of the incident light, and allows another portion of the incident light to pass therethrough. Since the second deflection part 25 is composed of a reflective volume hologram, the incident angle and the reflection angle of the light can be different from each other unlike a typical mirror. Thus, even when the second deflection part 25 is disposed substantially in front of the eye of the observer, the image light incident at a large incident angle from the first deflection part 24 can be guided to the pupil of the observer. In addition, an intermediate image is generated on the optical path between the first deflection part 24 and the second deflection part 25. Note that the second deflection part 25 may be composed of a semi-transmissive reflection mirror that reflects a portion of the incident light, and allows another portion of the incident light to pass therethrough.

The first external light transmittance adjustment part 27 is provided outside the optical path of the image light between the first deflection part 24 and the second deflection part 25. The first external light transmittance adjustment part 27 is composed of a semi-transmissive absorbing film that absorbs a portion of the incident light and allows another portion of the incident light to pass therethrough in the visible light wavelength range. Alternatively, the first external light transmittance adjustment part 27 may be composed of a semi-transmissive reflection film that reflects a portion of the incident light and allows another portion of the incident light to pass therethrough in the visible light wavelength range. In this manner, the first external light transmittance adjustment part 27 has light absorbency or light reflectivity for external light. For example, a metal film, a dielectric multilayer film, or the like is used as the semi-transmissive absorbing film and the semi-transmissive reflection film. The first external light transmittance adjustment part 27 may have a curved shape or a planar shape.

In the image display part 110 of this embodiment, the first deflection part 24, the second deflection part 25, and the first external light transmittance adjustment part 27 are provided on the common base member 29. While each of the first deflection part 24, the second deflection part 25, and the first external light transmittance adjustment part 27 may be provided on a first surface 29a and/or a second surface 29b of the base member 29, they are provided in the first surface 29a facing the face of the observer through a bonding material (not illustrated) in the example illustrated in FIG. 3, for example. The end portions of the two members may be in contact with each other or may be separated from each other between the first deflection part 24 and the first external light transmittance adjustment part 27, and between the second deflection part 25 and the first external light transmittance adjustment part 27. When the two members are separated from each other, a bonding material may be provided in the spacing. In addition, desirably, the distance between the two members is smaller than the pupil diameter of the observer, and is, for example, smaller than 2 mm.

The first deflection part 24, the second deflection part 25, and the first external light transmittance adjustment part 27 are disposed such that the angle with respect to an optical axis ax1 of the exit pupil is within a range of 100 degrees. Specifically, $\theta \leq 100°$ holds, where $\theta$ represents an angle between the optical axis ax1 of the exit pupil and a straight line L1 connecting the center of the exit pupil and the end portion of the first deflection part 24 on the correction optical system 12 side as illustrated in FIG. 3. Further, it is more desirable that the first deflection part 24, the second deflection part 25, and the first external light transmittance adjustment part 27 be disposed such that the angle $\theta$ with respect to the optical axis ax1 of the exit pupil is within a range of 60 degrees.

Here, as an index representing the degree of transmittance of the external light, the average external light transmittance is considered for each of the first deflection part 24, the second deflection part 25, and the first external light transmittance adjustment part 27. Assuming that the visible light wavelength range is 400 to 700 nm, the average external light transmittance is defined as the average value of the transmittance for a plurality of light beams having incident angles different from each other within the transmissive incident angle range of each member, and different wavelengths in the visible light wavelength range. The average external light transmittance of the first deflection part 24, the second deflection part 25, and the first external light transmittance adjustment part 27 can be measured using a measurement device such as a spectral transmittance meter, for example.

As illustrated in FIG. 3, the second deflection part 25 is positioned in front of the eye of the observer, and the first deflection part 24 is positioned in obliquely front of the face of the observer. It is therefore desirable that the average external light transmittance of the second deflection part 25 be higher than the average external light transmittance of the first deflection part 24 to view the external image in a better manner. For this reason, in this embodiment, the average external light transmittance of the second deflection part 25 is set to 80%, and the average external light transmittance of the first deflection part 24 is set to 30% as examples of specific numerical values. Note that the average external light transmittance of the first deflection part 24 and the average external light transmittance of the second deflection part 25 are not limited to 30% and 80%, and may be appropriately changed within a range that satisfies the above-described desirable conditions.

In contrast, the average external light transmittance of the first external light transmittance adjustment part 27 is higher than one of the average external light transmittance of the first deflection part 24 and the average external light transmittance of the second deflection part 25 lower than the other, and is lower than one of the average external light transmittance of the first deflection part 24 and the average external light transmittance of the second deflection part 25 higher than the other. Accordingly, the average external light transmittance of the first external light transmittance adjustment part 27 is higher than 30% and lower than 80%.

Specifically, the average external light transmittance of the first external light transmittance adjustment part 27 may be constant or may vary in the first external light transmittance adjustment part 27. Specific examples of the average external light transmittance of the first external light transmittance adjustment part 27 include the following three patterns, for example.

Figure 5:
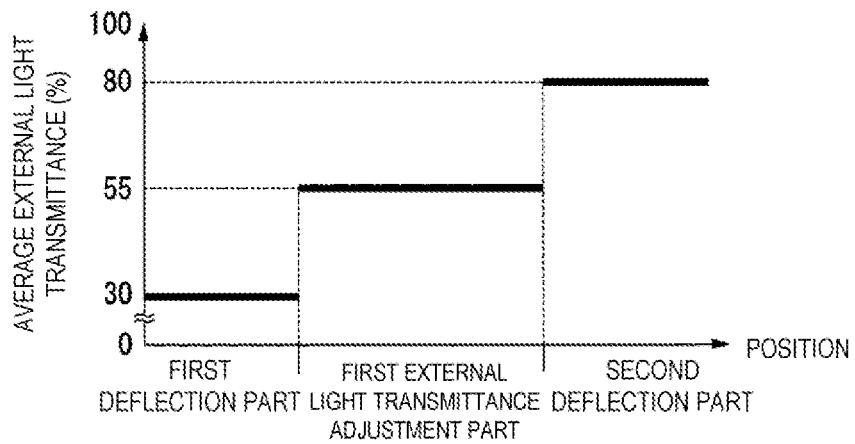
FIG. 5 is a diagram illustrating a first example of a pattern of an average external light transmittance of a first external light transmittance adjustment part.

FIG. 5 is a diagram illustrating a first example of a pattern of the average external light transmittance of the first external light transmittance adjustment part 27.

In the first example illustrated in FIG. 5, the average external light transmittance of the first external light transmittance adjustment part 27 is constant at 55% in the first external light transmittance adjustment part 27. In this example, the average external light transmittance of the first external light transmittance adjustment part 27, i.e., 55%, is set to the average value of the average external light transmittance of the first deflection part 24, i.e., 30%, and the average external light transmittance of the second deflection part 25, i.e., 80%. Note that the average external light transmittance of the first external light transmittance adjustment part 27 may not be set to the average value of the average external light transmittance of the first deflection part 24 and the average external light transmittance of the second deflection part 25.

Figure 6:
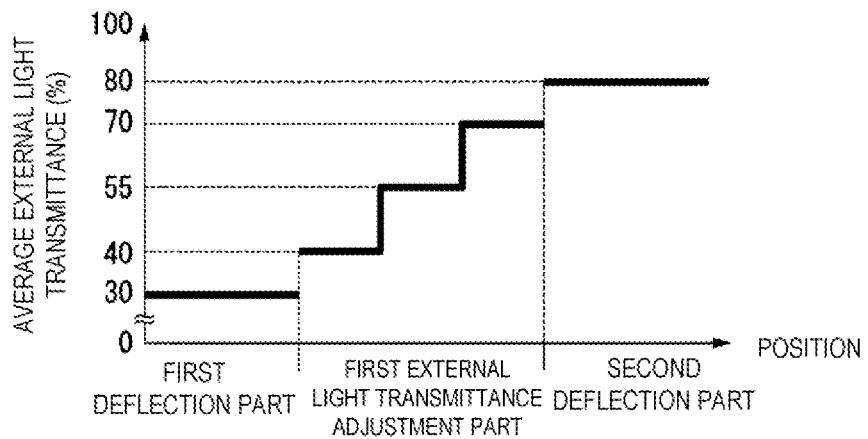
FIG. 6 is a diagram illustrating a second example of a pattern of an average external light transmittance of the first external light transmittance adjustment part.

FIG. 6 is a diagram illustrating a second example of a pattern of an average external light transmittance of the first external light transmittance adjustment part 27.

In the second example illustrated in FIG. 6, the average external light transmittance of the first external light transmittance adjustment part 27 varies stepwise between the average external light transmittance of the first deflection part 24 and the average external light transmittance of the second deflection part 25. In this example, the average external light transmittance of the first external light transmittance adjustment part 27 varies in three steps of 40%, 55%, and 70% in this order from the first deflection part 24 toward the second deflection part 25. Note that the number of steps of the variation of the average external light transmittance and the value of the average external light transmittance at each step are not particularly limited to the above-described examples.

Figure 7:
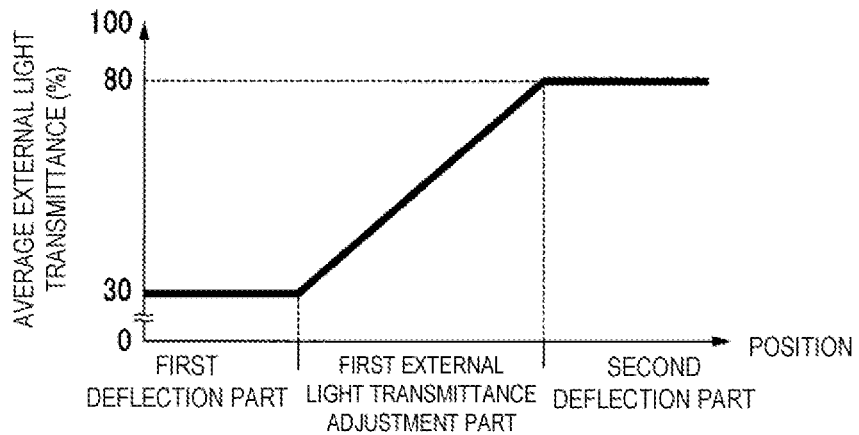
FIG. 7 is a diagram illustrating a third example of a pattern of an average external light transmittance of the first external light transmittance adjustment part.

FIG. 7 is a diagram illustrating a third example of a pattern of an average external light transmittance of the first external light transmittance adjustment part 27.

In the third example illustrated in FIG. 7, the average external light transmittance of the first external light transmittance adjustment part 27 linearly varies between the average external light transmittance of the first deflection part 24 and the average external light transmittance of the second deflection part 25. Note that the average external light transmittance of the first external light transmittance adjustment part 27 may vary in a curved manner between the average external light transmittance of the first deflection part 24 and the average external light transmittance of the second deflection part 25. That is, the rate of change of the average external light transmittance of the first external light transmittance adjustment part 27 may vary or may be constant regardless of the position in the first external light transmittance adjustment part 27.

In the image display device of JP-A-2016-71309, no member is provided between the second deflection part and the first deflection part, and a space is provided therebetween. As a result, when it is assumed that the average external light transmittance of the second deflection part is 80% and the average external light transmittance of the first deflection part is 30% as in this embodiment, a region having an average external light transmittance of 80%, a region having an average external light transmittance of 100%, and a region having an average external light transmittance of 30% are aligned in the viewing range of the observer. In this case, when the observer views an external image, a boundary having a largely different brightness is present in the external image, and consequently unpleasantness may be caused. Note that even in a case where a given transparent member is disposed between the second deflection part and the first deflection part, unpleasantness may be caused when the transparent member is a typical transparent member having an average external light transmittance of 90% or higher, for example.

In contrast, in this embodiment, the first external light transmittance adjustment part 27 having an average external light transmittance higher than 30% and lower than 80% is provided between the second deflection part 25 and the first deflection part 24. Accordingly, a region having an average external light transmittance of 80%, a region having an average external light transmittance higher than 30% and lower than 80%, and a region having an average external light transmittance of 30% are aligned in the viewing range of the observer. In this case, the brightness in the external image gradually changes from the front to the lateral side of the eye of the observer, and there is no boundary having a largely different brightness in the external image. Thus, the HMD 300 of this embodiment can reduce the unpleasantness that is caused when the observer views the external image.

In addition, when the average external light transmittance of the first external light transmittance adjustment part 27 is constant as illustrated in FIG. 5, a thin film constituting the first external light transmittance adjustment part 27 can be easily formed.

In addition, when the average external light transmittance of the first external light transmittance adjustment part 27 is varied stepwise as illustrated in FIG. 6, the difference in average external light transmittance between two regions having the average external light transmittances different from each other is small, and thus the unpleasantness that is caused when the external image is viewed can be sufficiently reduced.

In addition, when the average external light transmittance of the first external light transmittance adjustment part 27 is linearly changed as illustrated in FIG. 7, there is no boundary between two regions having the average external light transmittances different from each other in the first external light transmittance adjustment part 27, and thus the unpleasantness that is caused when the external image is viewed can be sufficiently reduced.

In addition, in this embodiment, since the first deflection part 24, the second deflection part 25, and the first external light transmittance adjustment part 27 are provided on the common base member 29, the first deflection part 24, the second deflection part 25, and the first external light transmittance adjustment part 27 can be easily aligned with each other in the assembly process in the manufacture of the HMD 300. In addition, since there is no joint in the base member 29 located between the first deflection part 24 and the first external light transmittance adjustment part 27 and between the second deflection part 25 and the first external light transmittance adjustment part 27, a reduction in visibility of the external image caused by the joint of the base member 29 is suppressed. Note that when the gap between the first deflection part 24 and the first external light transmittance adjustment part 27 and the gap between the second deflection part 25 and the first external light transmittance adjustment part 27 are smaller than the pupil diameter, a reduction in visibility of the external image caused by the gaps can also be suppressed.

In general, the field of view of a human is said to be within about 100 degrees on one side from the front, and in particular, the range within which color can be recognized is said to be within about 60 degrees. In this regard, in this embodiment, since the first deflection part 24, the second deflection part 25, and the first external light transmittance adjustment part 27 are disposed within a range of 100 degrees from the optical axis ax1 of the exit pupil, the observer can recognize substantially all external images within the viewing range through the first deflection part 24, the second deflection part 25, and the first external light transmittance adjustment part 27. Further, when the first deflection part 24, the second deflection part 25, and the first external light transmittance adjustment part 27 are disposed within a range of 60 degrees from the optical axis ax1 of the exit pupil, the color of the external image can be recognized through the first deflection part 24, the second deflection part 25, and the first external light transmittance adjustment part 27.

Second Embodiment

A second embodiment of the present disclosure is described below with reference to FIG. 8.

The basic configuration of an HMD of this embodiment is similar to that of the first embodiment except in configuration of the light-guiding optical system.

Figure 8:
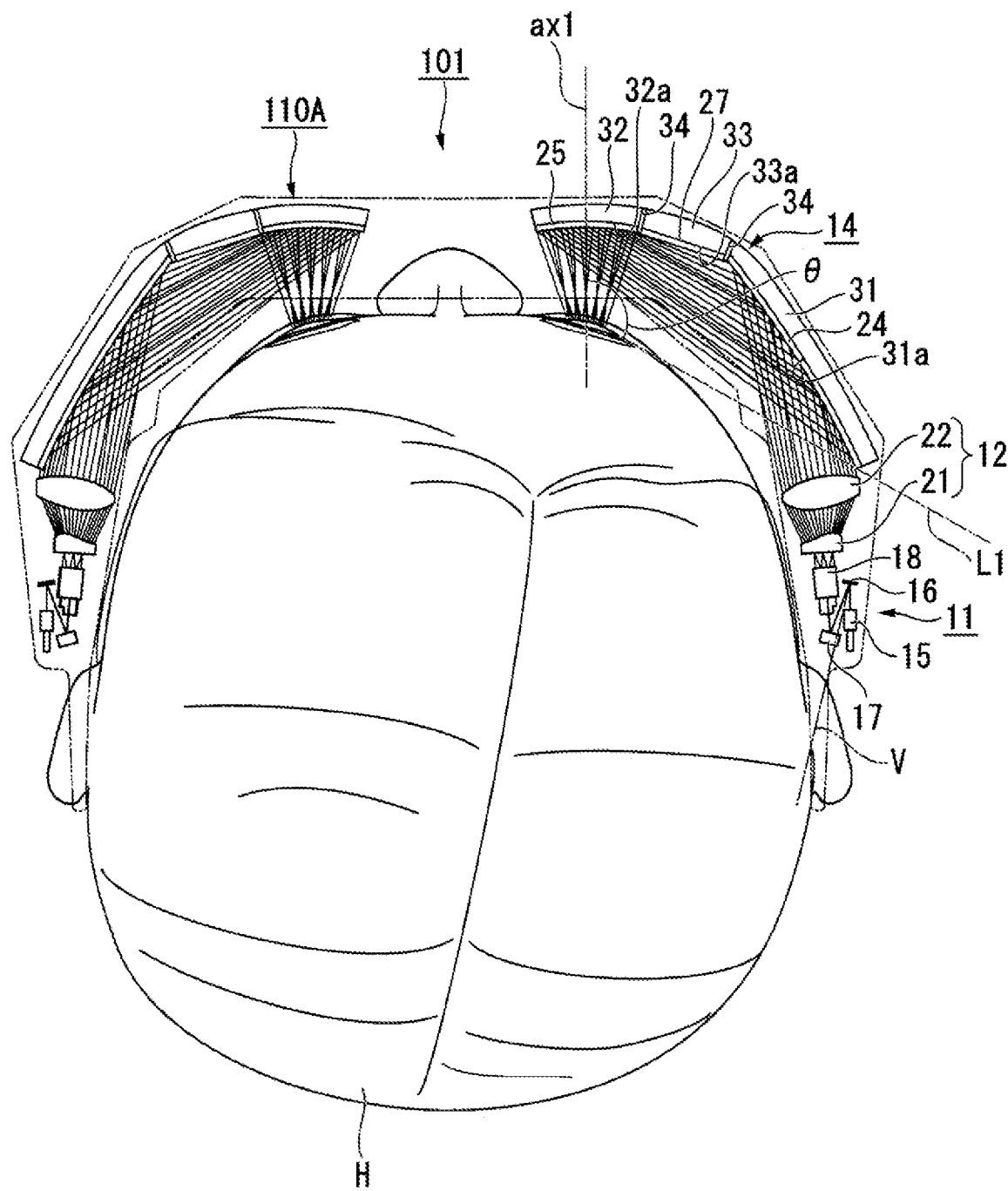
FIG. 8 is a plan view illustrating a schematic configuration of a transmissive image display device of a second embodiment.

FIG. 8 is a plan view illustrating a schematic configuration of a display device of the second embodiment.

In FIG. 8, the components common to those of FIG. 3 used in the first embodiment are denoted with the same reference signs, and the detailed description thereof is omitted.

As illustrated in FIG. 8, in a display device 101 of this embodiment, a light-guiding optical system 14 includes the first deflection part 24, a first base member 31, the second deflection part 25, and a second base member 32. The first deflection part 24 is provided on a first surface 31a of the first base member 31. The second deflection part 25 is provided on a first surface of a second base member 32a.

The first external light transmittance adjustment part 27 is provided on a first surface 33a of a third base member 33. In addition, the first base member 31, the second base member 32, and the third base member 33 are joined to each other through a bonding material 34, for example. In addition, desirably, the thickness of the bonding material 34 between base members 31, 32 and 33 adjacent to each other is smaller than the pupil diameter of the observer, and is, for example, smaller than 2 mm. In addition, desirably, the gap between base members 31, 32 and 33 adjacent to each other is formed to substantially extend along a straight line connecting the center of the exit pupil and the gap. Other configurations of the display device 101 are similar to those of the first embodiment.

This embodiment can also achieve effects similar to those of the first embodiment, such as a reduction in unpleasantness when the observer views the external image.

In addition, in this embodiment, since the first deflection part 24, the second deflection part 25, and the first external light transmittance adjustment part 27 are provided on the different base members 31, 32 and 33, respectively, a design change, a specification change and the like of the first deflection part 24, the second deflection part 25 or the first external light transmittance adjustment part 27 in the manufacturing process of the display device 101 can be achieved by only replacing the set of the first deflection part 24, the second deflection part 25 or the first external light transmittance adjustment part 27 and the base member 31, 32 or 33.

Third Embodiment

A third embodiment of the present disclosure is described below with reference to FIGS. 9 and 10.

The basic configuration of an HMD of this embodiment is similar that of the first embodiment, and differs from the first embodiment in that a second external light transmittance adjustment part is provided in place of the first external light transmittance adjustment part.

Figure 9:
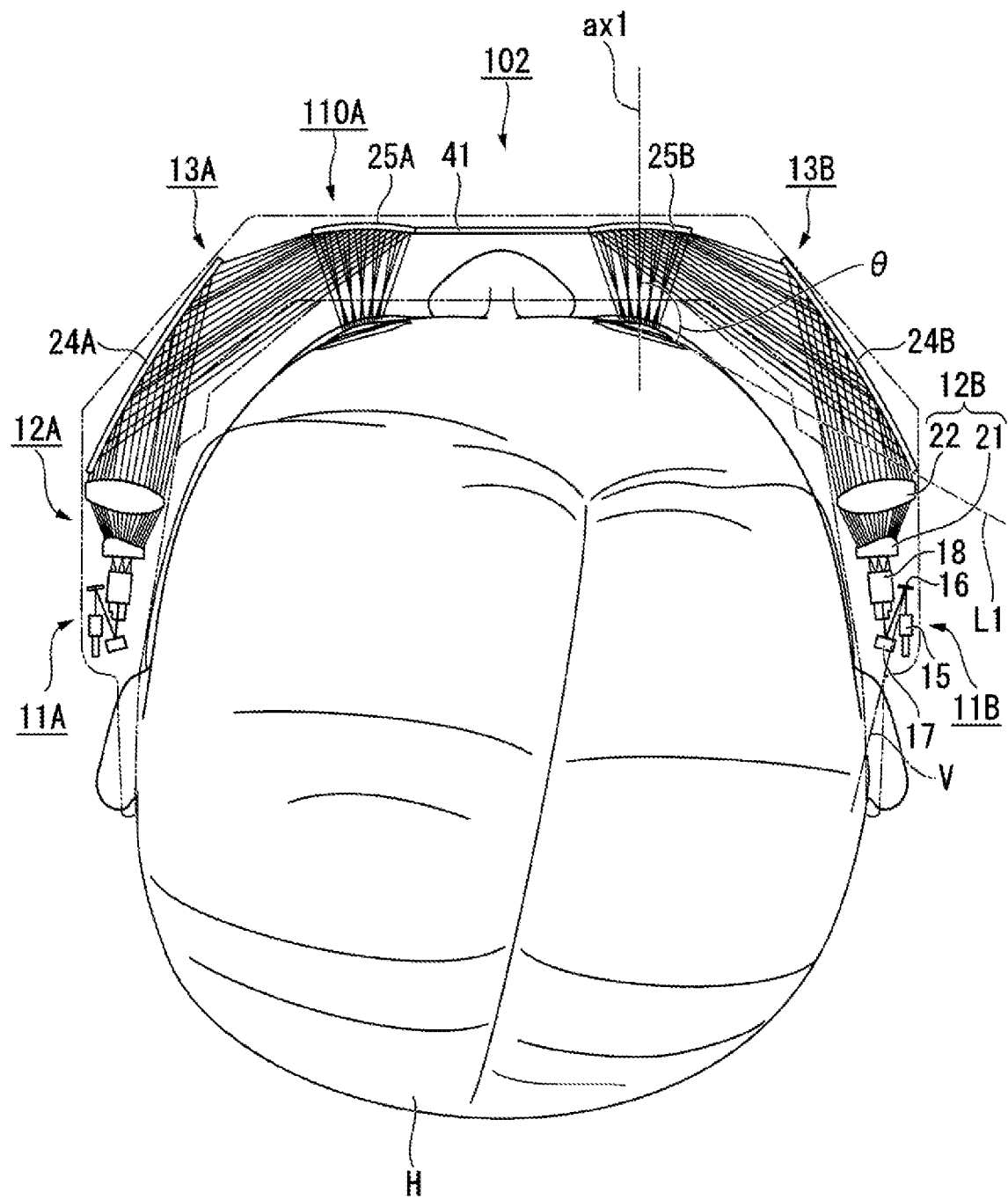
FIG. 9 is a plan view illustrating a schematic configuration of a transmissive image display device of a third embodiment.

FIG. 9 is a plan view illustrating a schematic configuration of a display device of the third embodiment.

In FIG. 9, the components common to those of the FIG. 3 used in the first embodiment are denoted with the same reference signs, and the detailed description thereof is omitted.

Note that while the right-eye image display part 110B is simply referred to as the image display part 110 and the description of the left-eye image display part 110A is omitted in the first embodiment, the words "left-eye" and "right-eye" are provided to the head of the terms of the constituent elements in this embodiment. Note that, in the left-eye image display part 110A and the right-eye image display part 110B, the constituent elements are symmetrically disposed, but the configuration and function of each component are similar to those of the first embodiment.

As illustrated in FIG. 9, the display device 102 of this embodiment includes the left-eye image display part 110A, the right-eye image display part 110B, and a second external light transmittance adjustment part 41.

The left-eye image display part 110A includes a left-eye image generation part 11A, a left-eye correction optical system 12A, and a left-eye light-guiding optical system 13A. The left-eye light-guiding optical system 13A includes a left-eye first deflection part 24A and a left-eye second deflection part 25A. The left-eye image generation part 11A emits light that includes image information. The left-eye light-guiding optical system 13A guides, toward the position of the left-eye exit pupil, the image light from the left-eye image generation part 11A. The left-eye first deflection part 24A deflects the image light emitted from the left-eye image generation part 11A. The left-eye second deflection part 25A further deflects the image light deflected by the left-eye first deflection part 24A, and guides the light to the position of the left-eye exit pupil while transmitting a portion of the external light.

The right-eye image display part 110B includes a right-eye image generation part 11B, a right-eye correction optical system 12B, and a right-eye light-guiding optical system 13B. The right-eye light-guiding optical system 13B includes a right-eye first deflection part 24B and a right-eye second deflection part 25B. The right-eye image generation part 11B emits light that includes image information. The right-eye light-guiding optical system 13B guides, toward the position of the right-eye exit pupil, the image light from the right-eye image generation part 11B. The right-eye first deflection part 24B deflects the image light emitted from the right-eye image generation part 11B. The right-eye second deflection part 25B further deflects the image light deflected by the right-eye first deflection part 24B, and guides the light to the position of the right-eye exit pupil while transmitting a portion of the external light.

The second external light transmittance adjustment part 41 is provided outside the optical path of the image light between the left-eye second deflection part 25A and the right-eye second deflection part 25B. The second external light transmittance adjustment part 41 is composed of a semi-transmissive absorbing film that absorbs a portion of the incident light and allows another portion of the incident light to pass therethrough in the visible light wavelength range. Alternatively, the second external light transmittance adjustment part 41 may be composed of a semi-transmissive reflection film that reflects a portion of incident light and allows another portion of the incident light to pass therethrough in the visible light wavelength range. In this manner, the second external light transmittance adjustment part 41 has light absorbency or light reflectivity for external light. For example, a metal film, a dielectric multilayer film, or the like is used as the semi-transmissive absorbing film and the semi-transmissive reflection film. The second external light transmittance adjustment part 41 may have a curved shape or a planar shape.

In this embodiment, the configuration for supporting the left-eye first deflection part 24A, the left-eye second deflection part 25A, the right-eye first deflection part 24B, the right-eye second deflection part 25B, and the second external light transmittance adjustment part 41 are not particularly limited. That is, the left-eye first deflection part 24A, the left-eye second deflection part 25A, the right-eye first deflection part 24B, the right-eye second deflection part 25B, and the second external light transmittance adjustment part 41 may be collectively provided on an integral base member, or may be provided on a plurality of base members.

In this embodiment, as examples of specific numerical values, the average external light transmittance of the left-eye second deflection part 25A is 80%, and the average external light transmittance of the right-eye second deflection part 25B is 80%. Desirably, to prevent unpleasantness of the external image, the average external light transmittance of the left-eye second deflection part 25A and the average external light transmittance of the right-eye second deflection part 25B are equal to each other.

Figure 10:
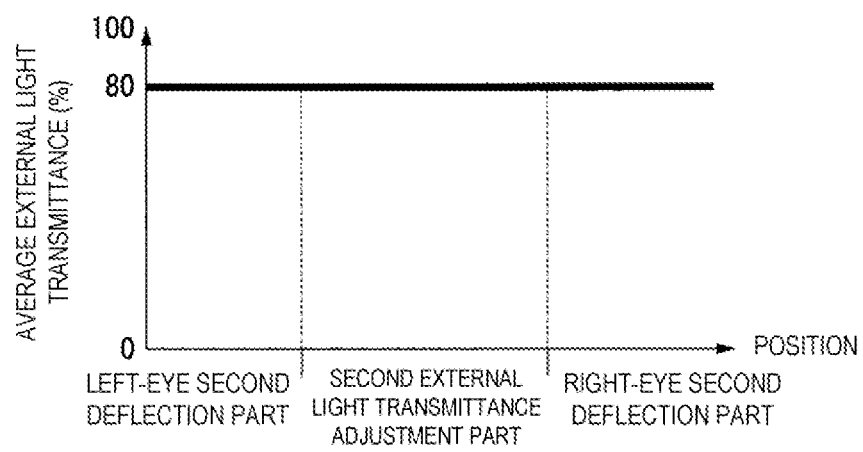
FIG. 10 is a diagram illustrating an example of a variation pattern of an average external light transmittance of a second external light transmittance adjustment part.

FIG. 10 is a diagram illustrating an example of a pattern of an average external light transmittance of the second external light transmittance adjustment part 41.

As illustrated in FIG. 10, the average external light transmittance of the second external light transmittance adjustment part 41 is equal to the average external light transmittance of the left-eye second deflection part 25A and the average external light transmittance of the right-eye second deflection part 25B. Accordingly, the average external light transmittance of the second external light transmittance adjustment part 41 is 80%.

As described above, the average external light transmittance of the left-eye second deflection part 25A and the average external light transmittance of the right-eye second deflection part 25B are desirably equal to each other, but the average external light transmittance of the left-eye second deflection part 25A and the average external light transmittance of the right-eye second deflection part 25B may differ from each other due to factors such as manufacturing variation of the volume hologram, for example.

In this case, desirably, the average external light transmittance of the second external light transmittance adjustment part 41 is higher than one of the average external light transmittance of the left-eye second deflection part 25A and the average external light transmittance of the right-eye second deflection part 25B lower than the other. Further, desirably, the average external light transmittance of the second external light transmittance adjustment part 41 is lower than one of the average external light transmittance of the left-eye second deflection part 25A and the average external light transmittance of the right-eye second deflection part 25B higher than the other. Accordingly, when the average external light transmittance of the left-eye second deflection part 25A is 80% and the average external light transmittance of the right-eye second deflection part 25B is 83%, the average external light transmittance of the second external light transmittance adjustment part 41 is desirably higher than 80% and lower than 83%.

Note that even when the average external light transmittance of the second external light transmittance adjustment part 41 slightly falls outside the above-described conditions, the achieved effect is better as compared with a case where the second external light transmittance adjustment part 41 is not present. However, when it excessively falls out of the above-described conditions, unpleasantness of the external image is caused. Therefore, to achieve the same effect as when the above-described conditions are satisfied and to reduce unpleasantness when it excessively falls out of the above-described conditions, it is appropriate to set the external light transmittance of the second external light transmittance adjustment part 41 to a range within ±10% of the average value of the average external light transmittance of the left-eye second deflection part 25A and the average external light transmittance of the right-eye second deflection part 25B.

More specifically, the following two cases are conceivable.

(1) When the difference between the average external light transmittance of the left-eye second deflection part 25A and the average external light transmittance of the right-eye second deflection part 25B is 10% or higher, it is desirable that the average external light transmittance of the second external light transmittance adjustment part 41 be higher than one of the average external light transmittance of the left-eye second deflection part 25A and the average external light transmittance of the right-eye second deflection part 25B lower than the other, and be lower than the higher one of them.

(2) When the difference between the average external light transmittance of the left-eye second deflection part 25A and the average external light transmittance of the right-eye second deflection part 25B is lower than 10%, it is desirable that the average external light transmittance be within ±5% of the average external light transmittance of the left-eye second deflection part 25A and the average external light transmittance of the right-eye second deflection part 25B.

From the above-described perspective, in the case of (2), the average external light transmittance of the second external light transmittance adjustment part 41 may be higher than 77.5% and lower than 85.5% when the average external light transmittance of the left-eye second deflection part 25A is 80% and the average external light transmittance of the right-eye second deflection part 25B is 83%, for example. In addition, the average external light transmittance may be higher than 75% and lower than 85% when the average external light transmittance of the left-eye second deflection part 25A and the average external light transmittance of the right-eye second deflection part 25B are both 80%, for example.

In the image display device of JP-A-2016-71309, no member is provided not only between the second deflection part and the first deflection part, but also between the left-eye second deflection part and the right-eye second deflection part. Consequently, as described in the first embodiment, when the observer views an external image, a boundary having a largely different brightness is present in the external image, and consequently unpleasantness may be caused.

In contrast, in this embodiment, the second external light transmittance adjustment part 41 having an average external light transmittance of 80% or approximately 80% is provided between the left-eye second deflection part 25A and the right-eye second deflection part 25B. As a result, the brightness in the external image gradually changes from the front of the left eye to the front of the right eye of the observer, and there is no boundary having a largely different brightness in the external image. Thus, the display device 102 of this embodiment can reduce the unpleasantness when the observer views the external image.

Fourth Embodiment

A fourth embodiment of the present disclosure is described below with reference to FIGS. 11 and 12.

The basic configuration of an HMD of this embodiment is similar to that of the third embodiment, and differs from the third embodiment in that the first external light transmittance adjustment part is additionally provided.

Figure 11:
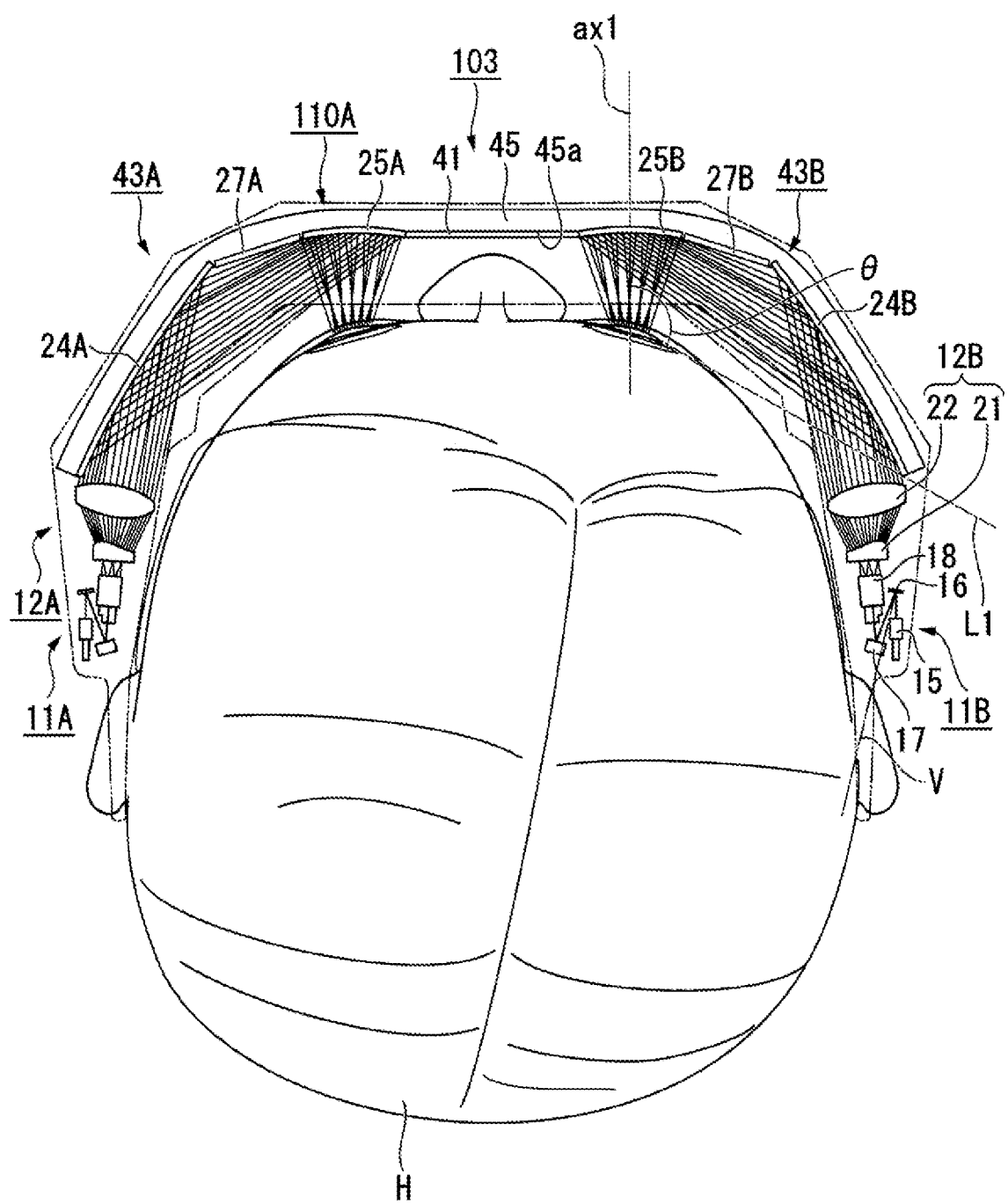
FIG. 11 is a plan view illustrating a schematic configuration of a transmissive image display device of a fourth embodiment.

FIG. 11 is a plan view illustrating a schematic configuration of a display device of the fourth embodiment.

In FIG. 11, the components common to those of FIG. 9 used in the third embodiment are denoted with the same reference signs, and the detailed description thereof is omitted.

As illustrated in FIG. 11, in a display device 103 of this embodiment, a left-eye light-guiding optical system 43A includes a left-eye first external light transmittance adjustment part 27A provided outside the optical path of the image light between the left-eye first deflection part 24A and the left-eye second deflection part 25A. A right-eye light-guiding optical system 43B includes a right-eye first external light transmittance adjustment part 27B provided outside the optical path of the image light between the right-eye first deflection part 24B and the right-eye second deflection part 25B. In addition, the second external light transmittance adjustment part 41 is provided outside the optical path of the image light between the left-eye second deflection part 25A and the right-eye second deflection part 25B.

In this embodiment, the left-eye first deflection part 24A, the left-eye first external light transmittance adjustment part 27A, the left-eye second deflection part 25A, the second external light transmittance adjustment part 41, the right-eye second deflection part 25B, the right-eye first external light transmittance adjustment part 27B, and the left-eye first deflection part 24B are provided on a first surface 45a of a common base member 45.

Other configurations of the display device 103 are the similar to those of the first embodiment.

Figure 12:
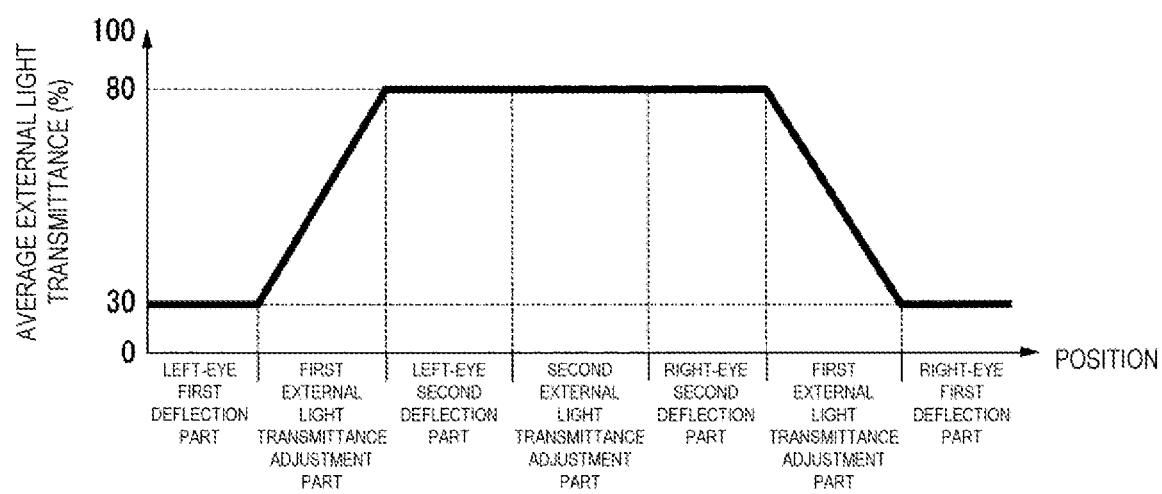
FIG. 12 is a diagram illustrating an example of a variation pattern of an average external light transmittance of a first external light transmittance adjustment part and a second external light transmittance adjustment part.

FIG. 12 is a diagram illustrating an example of a pattern of an average external light transmittance of the left-eye first external light transmittance adjustment part 27A, the second external light transmittance adjustment part 41, and the left-eye first external light transmittance adjustment part 27B.

As illustrated in FIG. 12, the average external light transmittances of the left-eye first deflection part 24A and the right-eye first deflection part 24B are set to 30%, and the average external light transmittances of the left-eye second deflection part 25A and the right-eye second deflection part 25B are set to 80%.

The average external light transmittance of the left-eye first external light transmittance adjustment part 27A linearly varies between 30%, which is the average external light transmittance of the left-eye first deflection part 24A and 80%, which is the average external light transmittance of the left-eye second deflection part 25A. Likewise, the average external light transmittance of the right-eye first external light transmittance adjustment part 27B linearly varies between 30%, which is the average external light transmittance of the right-eye first deflection part 24B and 80%, which is the average external light transmittance of the right-eye second deflection part 25B. The average external light transmittance of the second external light transmittance adjustment part 41 is 80% as with the average external light transmittance of the left-eye second deflection part 25A and the average external light transmittance of the right-eye second deflection part 25B.

With the left-eye first external light transmittance adjustment part 27A, the second external light transmittance adjustment part 41, and the right-eye first external light transmittance adjustment part 27B, the display device 103 of this embodiment can reduce the unpleasantness in the entire field of view when the observer views the external image.

In addition, in this embodiment, the members composed of the left-eye first deflection part 24A, the left-eye first external light transmittance adjustment part 27A, the left-eye second deflection part 25A, the second external light transmittance adjustment part 41, the right-eye second deflection part 25B, and the right-eye first external light transmittance adjustment part 27B and the left-eye first deflection part 24B are provided on the common base member 45, and thus the above-described members can be easily aligned with each other in the assembly process in the manufacture of the display device 103. In addition, since there is no joint in the base member 45 located between the above-described two adjacent members, a reduction in visibility of the external image caused by the joint of the base member can be suppressed. In addition, when the gap between two adjacent members is smaller than the pupil diameter, a reduction in visibility of the external image caused by the gaps can be suppressed.

Note that the technical scope of the present disclosure is not limited to the above-described embodiments, and various modifications can be made without departing from the spirit and gist of the present disclosure.

For example, while the entire first external light transmittance adjustment part is provided outside the optical path of the light between the first deflection part and the second deflection part in the above-described embodiment, a portion of the first external light transmittance adjustment part may be provided outside the optical path of the light between the first deflection part and the second deflection part, and another portion of the first external light transmittance adjustment part may be located in the optical path of the light between the first deflection part and the second deflection part.

For example, as a result of one end of the first external light transmittance adjustment part overlapping the light deflection region of the first deflection part and another end of the first external light transmittance adjustment part overlapping the light deflection region of the second deflection part, both ends of the first external light transmittance adjustment part may be located in the optical path of the light between the first deflection part and the second deflection part. With this configuration, defects such as a partial image loss and reduction in image quality occur in the portion overlapping the light deflection region at both ends of the first external light transmittance adjustment part; however, such defects occur at peripheral portions where deficiencies are less clearly visible because of the visual characteristics of the human. In addition, the size of the optical system can be reduced by overlapping both ends of the first external light transmittance adjustment part and the optical deflection region of each deflection part.

In addition, when the average external light transmittance of the first deflection part is 30% and the average external light transmittance of the second deflection part is 80%, the average external light transmittance of the first external light transmittance adjustment part is higher than 30% and lower than 80% in the above-described example, but the average external light transmittance of the first external light transmittance adjustment part may have any value as long as the average external light transmittance is at least higher than 30%, and the average external light transmittance may be 85%, for example. That is, it suffices that the average external light transmittance of the first external light transmittance adjustment part at least meets the condition that it is higher than one of the average external light transmittance of the first deflection part and the average external light transmittance of the second deflection part lower than the other. Even in this case, it is possible to reduce the unpleasantness of the external image as compared with a case where a space is provided between the first deflection part and the second deflection part.

In addition, the image generation part includes the optical scanning device in the above-described embodiment, but, in place of this configuration, the image generation part may include a display device such as a liquid crystal panel and an organic EL panel. The first deflection part and the second deflection part are not limited to a mirror or a reflective volume hologram, and may include a Fresnel lens, a prism, and the like. Further, the specific configuration of each part of the transmissive image display device is not limited to the above-mentioned embodiments, and may be appropriately modified.

In addition, the transmissive image display device is a head-mounted display as an example in the above-described embodiment, but the present disclosure may be applied to a so-called handheld display, such as pair of binoculars, which is a display with a device body configured to be held by hand to look through.

What is claimed is:

1. A transmissive image display device comprising:
an image generation part configured to emit light including image information; and
a light-guiding optical system configured to guide, to a position of an exit pupil, light from the image generation part, wherein
the light-guiding optical system includes:
a first deflection part configured to deflect light emitted from the image generation part; and
a second deflection part configured to further deflect light deflected by the first deflection part to guide the light to the position of the exit pupil while transmitting a portion of external light;
a first external light transmittance adjustment part is provided outside an optical path of the light between the first deflection part and the second deflection part;
the first external light transmittance adjustment part has light absorbency or light reflectivity for the external light;
an average external light transmittance of the first external light transmittance adjustment part is higher than one of an average external light transmittance of the first deflection part and an average external light transmittance of the second deflection part and lower than the other;
the first deflection part is provided at a first base member;
the second deflection part is provided at a second base member;
the first external light transmittance adjustment part is provided at a third base member; and
the first base member, the second base member, and the third base member are joined to each other.

2. The transmissive image display device according to claim 1, wherein the average external light transmittance of the first external light transmittance adjustment part is lower than one of the average external light transmittance of the first deflection part and the average external light transmittance of the second deflection part and higher than the other.

3. The transmissive image display device according to claim 1, wherein the average external light transmittance of the first external light transmittance adjustment part varies stepwise between the average external light transmittance of the first deflection part and the average external light transmittance of the second deflection part.

4. The transmissive image display device according to claim 1, wherein the average external light transmittance of the first external light transmittance adjustment part linearly varies between the average external light transmittance of the first deflection part and the average external light transmittance of the second deflection part.

5. The transmissive image display device according to claim 1, wherein the first deflection part, the second deflection part, and the first external light transmittance adjustment part are disposed within an angle range of 100 degrees with respect to an optical axis of the exit pupil.

6. The transmissive image display device according to claim 1, wherein the first deflection part includes a semi-transmissive reflection mirror configured to reflect a portion of incident light and transmit another portion of the incident light.

7. The transmissive image display device according to claim 1, wherein the second deflection part includes a reflective volume hologram configured to diffract and deflect a portion of incident light.

8. A transmissive image display device comprising a right-eye image display part and a left-eye image display part, wherein
the right-eye image display part includes:
a right-eye image generation part configured to emit light including image information; and
a right-eye light-guiding optical system configured to guide, toward a position of a right-eye exit pupil, light from the right-eye image generation part;
the right-eye light-guiding optical system includes:
a right-eye first deflection part configured to deflect light emitted from the right-eye image generation part; and
a right-eye second deflection part configured to further deflect light deflected by the right-eye first deflection part to guide the light to the position of the right-eye exit pupil while transmitting a portion of the external light;
a first external light transmittance adjustment part is provided outside an optical path of the light between the right-eye first deflection part and the right-eye second deflection part;
the first external light transmittance adjustment part has light absorbency or light reflectivity for the external light;
an average external light transmittance of the first external light transmittance adjustment part is higher than one of an average external light transmittance of the right-eye first deflection part and an average external light transmittance of the right-eye second deflection part and lower than the other;
the right-eye first deflection part is provided at a first base member;
the right-eye second deflection part is provided at a second base member;
the first external light transmittance adjustment part is provided at a third base member; and
the first base member, the second base member, and the third base member are joined to each other,
the left-eye image display part includes:
a left-eye image generation part configured to emit light including image information; and
a left-eye light-guiding optical system configured to guide, toward a position of a left-eye exit pupil, light from the left-eye image generation part;
the left-eye light-guiding optical system includes:
a left-eye first deflection part configured to deflect light emitted from the left-eye image generation part; and
a left-eye second deflection part configured to further deflect light deflected by the left-eye first deflection part to guide the light to the position of the left-eye exit pupil while transmitting a portion of the external light;
a second external light transmittance adjustment part is provided outside an optical path of the light between the right-eye second deflection part and the left-eye second deflection part;
the second external light transmittance adjustment part has light absorbency or light reflectivity for the external light; and an average external light transmittance of the second external light transmittance adjustment part is higher than one of an average external light transmittance of the right-eye second deflection part and an average external light transmittance of the left-eye second deflection part and lower than the other.

9. The transmissive image display device according to claim 8, wherein the average external light transmittance of the second external light transmittance adjustment part is lower than one of the average external light transmittance of the right-eye second deflection part and the average external light transmittance of the left-eye second deflection part and higher than the other.

10. A transmissive image display device comprising a right-eye image display part and a left-eye image display part, wherein
the right-eye image display part includes:
a right-eye image generation part configured to emit light including image information; and
a right-eye light-guiding optical system configured to guide, toward a position of a right-eye exit pupil, light from the right-eye image generation part;
the right-eye light-guiding optical system includes:
a right-eye first deflection part configured to deflect light emitted from the right-eye image generation part; and
a right-eye second deflection part configured to further deflect light deflected by the right-eye first deflection part to guide the light to the position of the right-eye exit pupil while transmitting a portion of the external light;
a first external light transmittance adjustment part is provided outside an optical path of the light between the right-eye first deflection part and the right-eye second deflection part;
the first external light transmittance adjustment part has light absorbency or light reflectivity for the external light;
an average external light transmittance of the first external light transmittance adjustment part is higher than one of an average external light transmittance of the right-eye first deflection part and an average external light transmittance of the right-eye second deflection part and lower than the other;
the right-eye first deflection part is provided at a first base member;
the right-eye second deflection part is provided at a second base member;
the first external light transmittance adjustment part is provided at a third base member; and
the first base member, the second base member, and the third base member are joined to each other,
the left-eye image display part includes:
a left-eye image generation part configured to emit light including image information; and
a left-eye light-guiding optical system configured to guide, toward a position of a left-eye exit pupil, light from the left-eye image generation part;
the left-eye light-guiding optical system includes:
a left-eye first deflection part configured to deflect light emitted from the left-eye image generation part; and
a left-eye second deflection part configured to further deflect light deflected by the left-eye first deflection part to guide the light to the position of the left-eye exit pupil while transmitting a portion of the external light;
a second external light transmittance adjustment part is provided outside an optical path of the light between the right-eye second deflection part and the left-eye second deflection part;
the second external light transmittance adjustment part has light absorbency or light reflectivity for the external light; and
an average external light transmittance of the second external light transmittance adjustment part is equal to an average external light transmittance of the right-eye second deflection part and an average external light transmittance of the left-eye second deflection part.

* * * * *